United States Patent

Minkara et al.

Patent Number: 5,840,179
Date of Patent: Nov. 24, 1998

[54] ULTRASONIC CONDITIONING AND WET SCUBBING OF FLY ASH

[75] Inventors: Rafic Y. Minkara, Kennesaw; Jerry L. Heavilon, Marietta, both of Ga.

[73] Assignee: JTM Industries, Inc., Kennesaw, Ga.

[21] Appl. No.: 40,515

[22] Filed: Mar. 17, 1998

Related U.S. Application Data

[60] Provisional application No. 60/050,167, Jun. 19, 1997.

[51] Int. Cl.$^6$ ............... B03D 1/02; B03B 1/00; B02C 19/18
[52] U.S. Cl. ............... 209/166; 209/3; 209/164; 241/1; 106/705; 106/DIG. 1; 106/405
[58] Field of Search ................. 209/164, 166, 209/167, 3; 241/1; 106/705, DIG. 1, 405

[56] References Cited

U.S. PATENT DOCUMENTS

| | | |
|---|---|---|
| 2,093,898 | 9/1937 | Taplin ............... 209/166 |
| 3,202,281 | 8/1965 | Weston . |
| 4,392,981 | 7/1983 | Corbeels . |
| 4,537,599 | 8/1985 | Greenwald, Sr. . |
| 4,919,807 | 4/1990 | Morton . |
| 5,059,309 | 10/1991 | Jordan ............... 209/164 |
| 5,299,692 | 4/1994 | Nelson . |

FOREIGN PATENT DOCUMENTS

| | | |
|---|---|---|
| 1201093 | 9/1986 | Japan . |
| 766650 | 9/1980 | Russian Federation . |
| 1233943 | 5/1986 | Russian Federation . |

OTHER PUBLICATIONS

Ultrasonic Ash/Pyrite Liberation, Buban, K.S.; Yungman, B.A. (Paladin Technology, Inc. (US)) Publ. Washington, D.C. (USA) Coal and Slurry Technology Association, 1991, pp. 323–334.

Primary Examiner—Thomas M. Lithgow
Attorney, Agent, or Firm—Biebel & French

[57] ABSTRACT

Processes for treating fly ash to enhance the fly ash as a pozzolan for portland cement mixes and to separate therefrom a substantial carbon compound and/or to increase the fineness of the fly ash include the treatment of a fly ash slurry with ultrasonic energy using ultrasonic horns immersed in a slurry of fly ash and water and imparting to said slurry such ultrasonic energy as to cause microscopic cavities to form and implode with high localized energy to break up fly ash agglomerations along cleavage lines and to break up carbon particles and matrices which have entrapped fly ash microspheres therein to release the microspheres into the slurry. A conditioner agent may be added at or during ultrasonic treatment to enhance the flotation of the carbon compound.

7 Claims, 5 Drawing Sheets

ULTRASONIC CONDITIONING AND WET SCUBBING OF FLY ASH

PRIOR PROVISIONAL APPLICATION

Applicant claims the benefit of the filing date of Provisional Application Ser. No. 60/050,167 filed Jun. 19, 1997.

BACKGROUND OF THE INVENTION

This invention relates to the recovery of useful components of fly ash derived from the burning of pulverized coal or from similar materials, by flotation.

Coal fired power plants generate fly ash from the combustion of pulverized coal, or combinations of pulverized coal and other carbonaceous supplemental fuels such as petroleum coke, woodbark, charcoal, wood, residual fibers, etc. The fly ash is captured in the power plant's emission control devices, such as by electrostatic precipitators and baghouses. The principal composition of fly ash includes an inert mineral fraction consisting primarily of ferro-aluminosilicate glass and residual unburned carbon from coal and/or other supplemental fuels.

The inert mineral fraction of fly ash is a pozzolan, which makes fly ash an acceptable mineral admixture for use in Portland cement concrete. The fly ash itself includes the devolatized mineral matter which had been trapped or loosely associated with the coal as well as incombustible components and elements of the coal and/or of the supplemental fuels. In addition to such incombustible components, the fly ash contains carbon rich particles which have not been completely combusted, usually due to the inefficiency of the boiler design or related conditions.

Specifications for the use of fly ash in Portland cement concrete are set out in ASTM #C-618. This specification limits the loss-on-ignition (LOI) content to fly ash pozzolan to less than 6%. The LOI value of fly ash is generally equal to the percent by weight of the unburned carbon content of the fly ash. This carbon content can vary from as little as about 0.5% up to 20% or more of the weight of the total fly ash product. However, for pozzolanic activity, a good quality fly ash should contain less than 1% carbon but, in any case, no more than about 4% carbon.

A high carbon fly ash as a pozzolanic mixture has a detrimental impact upon the quality of concrete. The presence of carbon reduces air entrainment, which, in many locations, is the only real protection which concrete has against freeze-thaw/wet-dry conditions. Therefore, the lower the carbon content, the better the concrete mix is from an air entrainment perspective. The presence of carbon also increases water requirements, reduces pozzolanic reactivity, and degrades the appearance of finished concrete surface. Thus, carbon negatively affects the strength, durability, and aesthetic appearance of concrete. Therefore, the lower the carbon content in any fly ash the better the fly ash as a concrete admixture.

The presence of high levels of unburned carbon and fly ash has been exacerbated by the use of nitrous oxide emission control apparatus at the fly-ash generating plants, and also by the economic incentive of power plants to use less expensive supplemental fuels, such as Columbian coals, and/or by the use of petroleum coke or to burn paper or tissue mill waste such as wood, woodbark, wood chips, and residual fibers.

Recent investigations have shown that the carbon particles themselves, are porous and tend to entrap small fly ash particles called microspheres. These microspheres, which are usually less than 1 micron in size, tend to occupy the surface pores of the devolatized carbon particles. While such spheres are highly desirable as a component of a fly ash mixture, when entrapped within the carbon content they contribute little or nothing to the cementitous reaction. Therefore, if the carbon fraction can be effectively and economically separated and removed from the fly ash and, if in doing so, the microspheres can be released and utilized as part of the pozzolanic material, then a more pure carbon fraction and an enhanced pozzolan may be realized.

Flotation has been suggested as a viable process for removing or reducing the carbon fraction in fly ash. In conventional carbon flotation systems, high carbon fly ash containing 4% or more unburned carbon is prescreened and mixed with water to make a 20% to 65% solids by weight slurry and conditioned in a mixing tank for 10 to 20 minutes using a collector reagent. The reagent normally consist of a hydrocarbon such as petroleum distillates premixed with surfactants such as petroleum sulfonates. The surfactants emulsify the petroleum distillates and promote their dispersion throughout the ash slurry. The emulsified and dispersed petroleum distillates have the affinity to adsorb onto carbon particles rendering them hydrophobic. The hydrophobic carbon particles are then floated and transported to the slurry surface with air bubbles and are trapped in a dark froth layer generated with the use of a frother reagent such as 2-ethylhexanol and other alcohols and glycols. The two slurry streams recovered from the flotation process; (1) carbon rich float and (2) pozzolan tailing are separately dewatered and dried prior to marketing.

Such processes are disclosed in Brewer U.S. Pat. No. 3,794,250 issued Feb. 26, 1974, Hurst et al. U.S. Pat No. 4,121,945 issued Oct. 24, 1978, Hwang U.S. Pat. No. 5,074,154 issued Sep. 10, 1991 and Groppo et al. U.S. Pat. No. 5,456,363 issued Oct. 10, 1995. All such processes depend upon mechanical conditioning prior to flotation. Typically conditioning up to one-half hour or more, is described in Hurst et al. Also, prolonged mechanical conditioning in water is believed to reduce or degrade the pozzolanic quality of the fly ash pozzolan fraction.

Thus, the conditioning step is costly both in terms of time and energy input. Also, such processes, to provide good separation in the flotation cells, use a surfactant or emulsifier in addition to the petroleum based reagent. The surfactant, such as a petroleum sulfonate, for example emulsifies the petroleum distillate and promotes dispersion. The use of an emulsifier adds to the cost of the process.

SUMMARY OF THE INVENTION

This invention relates to a modification to the conventional carbon/ash wet separation process. Said modification includes the use of ultrasonic energy to condition the ash prior to carbon flotation. Ultrasonic conditioning has shown to increase the amount of pozzolan recovered from fly ash and improve its end use characteristics. The measured benefits of the ultrasonic conditioning include: (1) an increase in the carbon content of the carbon rich float, (2) a lower median diameter of the pozzolan particles, (3) a tapered variability of the pozzolan particle size distribution, (4) an increase in the specific surface area of the pozzolan particles, and (5) an enhancement of the reactivity of the pozzolan.

In the process of this invention, mechanical conditioning is replaced and/or supplemented by a conditioner in which ultrasonic energy is applied to a slurry of fly ash and water. If flotation is required, a petroleum-based collector reagent is added. The process of conditioning by the application of ultrasonic energy into the slurry results in an extremely fine emulsification of the reagent in the water and a substantially improved adsorption of the reagent by the carbon fraction. In addition, this is accomplished more completely and rapidly than by mechanical mixing and agitation alone, with improved adsorption. Also, it has been found that the usual surfactant may be eliminated altogether.

It has been found that the emulsification of the petroleum in a water slurry made up of a pre-screened fly ash with between about 20 to 60% solids by weight results in a more complete adsorption of the hydrocarbon onto the carbon particles and with less time than has heretofore been possible with mechanical mixing. The emulsified and dispersed petroleum distillates have a greater affinity to be adsorbed onto the carbon particles, rendering them hydrophobic and thus subject to flotation and transportation to the surface in a flotation system.

The ultrasonic vibration is preferably applied by multiple ultrasonic energy sources or emitters, immersed in the fly ash water slurry and causing the slurry to be positioned or moved in close proximity to the ultrasonic energy. This energy causes continuous cavitations followed by implosions of microscopic cavities in the liquid. The repetitive creation and collapse of such cavities produces shock waves with high differential pressures that cause the particles in the medium and the medium itself to be intensely agitated. Cavitation bubbles or cavities develop localized energy levels that are many times greater than energy levels achieved by mechanical mixing.

A secondary advantage is that weakly bonded fly ash particles are caused to break along cleavage planes and separate. The particle size distribution is reduced or narrowed with result that the product has an increased surface area. The carbon particles or carbon matrices tend to be fractioned and effectively wet scrubbed to release the microspheres into the slurry while, at the same time, enlarged agglomerated fly ash particles tend to be broken up into smaller particles. The freeing of microspheres and the increase in surface area of the non-carbon fraction causes an enhancement in its pozzolanic activity, when separated from the slurry and dried.

The pozzolan product consists of the glassy high ferrosilica-alumina component of the processed ash with low residual unburned carbon. The pozzolan product has superior pozzolanic qualities and much higher market value than the raw fly ash material when used as a Portland cement addition. The carbon rich product consists of unburned carbon along with 10% to 50% non-separated mineral matter.

The substantial increase in surface area and the reduction of mean particle size provides a significant enhancement to fly ash which is already low in carbon content and is, itself, a viable fly ash enhancement process apart from carbon removal. Depending upon the initial coarseness of the fly ash, test results show an increase in surface area of between 12% and 65%.

A further advantage results in the "polishing" of the fly ash particles by the ultrasonic vibration or the impact thereof against the particles, tending to remove surface salts and driving at least some of these salts into solution. This polishing action increases the available reactive sites on the fly ash particles and reduces inactive surface films.

Conditioning with ultrasonic energy may be used to condition the initial feed to a flotation system, such as the system as described in Pike et al. U.S. patent application, Ser. No. 08/760,046 filed Dec. 4, 1996, incorporated herein by reference. However, it is particularly effective when used as the conditioner and wet scrubber of the first carbon rich float prior to the application of this float to a second flotation stage.

Instead of treating the whole fly ash stream and to reduce ultrasonic energy requirements, the carbon concentrate float from a conventional flotation system can be reprocessed using ultrasonic energy. A carbon concentrate slurry stream, which is much smaller by volume than the whole fly ash slurry, is conditioned using ultrasonic energy and reagents then re-floated to produce more concentrated carbon and to recover the superfine pozzolan fraction trapped in the vesicles of the coarser carbon matrix or particle.

The ultrasonic vibration is applied using multiple sources (horns) immersed in the slurry. The number of horns and the size of the horns, which are available in 1" to 2" in diameter, depend on the system capacity and power requirements. The ultrasonic horns are inserted in the process slurry so that the face of the horns come close to the material being treated. Each ultrasonic horn is driven by a power supply which converts AC line voltage preferably to 20 kHz electrical energy. A piezoelectric converter transforms the electrical energy to longitudinal mechanical vibration with constant amplitude. The converter vibrates the horn preferably at the rate of 20,000 times per seconds which in turn transfers the vibration into the processed slurry. The vibration of the horn tip in the slurry medium creates continuous implosions of microscopic cavities in water. The repetitive creation and bursting of microscopic vapor bubbles produces shock waves and high differential pressures near the tip of the horn causing particles in the medium to become intensely agitated. Collisions between the particles cause weakly bonded particles such as fly ash particles agglomerations to separate or break along cleavage planes. Also, the intense agitation produces localized high liquid velocities which scour clean and polish carbon and ash surfaces. The scoured surfaces of carbon particles contain more active sites thus improving reagent adsorption for better carbon flotation. The polished ash particles are believed to contain less inactive surface films rendering the ash more pozzolanic in a Portland cement concrete matrix.

Ultrasonic conditioning of fly ash prior to carbon flotation increased carbon recovery by an additional 10% to 20% depending on the particular ash. Pozzolan recovery was increased from 74.7% using conventional conditioning to 85.5% using ultrasonic conditioning for a domestic coal fly ash with an initial carbon content of 10.5%. Also, pozzolan recovery from Colombian coal ash was increased from 60.3% to 81.2% when using ultrasonic conditioning versus conventional mechanical conditioning.

The quality of the carbon float is also improved using ultrasonic conditioning. The carbon content of the float was increased from 38.5% to 68.9% for domestic coal ash and from 21.4% to 36.2% for Colombian (high carbon) coal ash when switching from conventional to ultrasonic conditioning.

Ultrasonic conditioning of fly ash produces finer pozzolan particles than conventional mechanical conditioning. The median diameter of pozzolan particle distribution was reduced by up to 50% for Colombian coal ash. The particle size variability was also reduced by ultrasonic conditioning. The standard deviation of the pozzolan particle size distribution was reduced from 44.7 $\mu$m to 22.5 $\mu$m for a Colombian coal ash and from 41.1 $\mu$m to 26.0 $\mu$m for a domestic coal ash after switching from conventional to ultrasonic conditioning. The pozzolan finesses, as measured by the weight percent of particles retained on No. 325 Mesh sieve was improved by 31% for a domestic coal ash and by 59% for a Colombian coal ash.

Pozzolans produced with ultrasonic conditioning of ash outperformed pozzolans produced with conventional mechanical conditioning in compressive strength tests. Compressive strength tests of cubes made with 20% pozzolan-cement replacement show improvements ranging between 5.6% and 22.5% by switching from such conventional conditioning to ultrasonic conditioning.

Ultrasonic conditioning of the carbon rich float collected from a conventional flotation process improved superfine pozzolan recovery when the float was reprocessed using ultrasonic energy versus a second stage mechanical attrition/scrubbing process. Ultrasonic conditioning of a first stage carbon float containing 12.5% carbon prior to second stage flotation increased the carbon content of the second float from 26.3% using mechanic attrition to 29.2% to 33.6% using ultrasonic attrition according to this invention. Superfine pozzolan recovery was increased from 52.1% using mechanical attrition to 58.4% and 63.2% using ultrasonic conditioning.

It is accordingly an important object of this invention to provide a process for the wet conditioning and scrubbing of a fly ash slurry, to render the carbon content thereof hydrophobic and to reduce the mean particle size, to release entrapped non-carbon components from the carbon fraction and to polish the surface of the non-carbon fly ash fraction to reduce the particle size and to remove salts and impurities from the surface of the inert particles.

A further object of the invention is the provision of a conditioning process by which a petroleum distillate is emulsified and applied to a carbon fraction of fly ash without the need for surfactants to enhance the emulsification.

A still further object of the invention is the provision of an ultrasonic process for reducing the particle size and increasing surface area of fly ash and a process for releasing microspheres from carbon particles in high carbon fly ash.

Other objects and advantages of the invention will be apparent from the following description, the accompanying drawings and the appended claims.

DESCRIPTION OF THE PREFERRED EMBODIMENT

In the realization of one aspect of the process of this invention, a fly ash product to be conditioned is diluted with water to form an approximately 20% slurry or higher which is subjected to ultrasonic conditioning at an equivalent rate of about 10–50 kilowatt hours per metric ton of dry solids preferably at a frequency of 20 kilohertz. As a conditioning stage, a suitable conditioner may be added and emulsified by the ultrasonic energy.

A series of tests were performed using fly ash of various grades or coarseness and various carbon contents to determine the efficacy of ultrasonic conditioning of fly ash and to determine the efficacy of particle size reduction and pozzolan activity enhancement. For the purpose of providing ultrasonic radiation, a Branson Model 110 liquid processing cell was used with a 1,000 watt power supply, and a frequency output of 20 kilohertz, as made by Branson Ultrasonics Corporation, 41 Eagle Road, Danbury, Conn. 06813.

Figure 1:
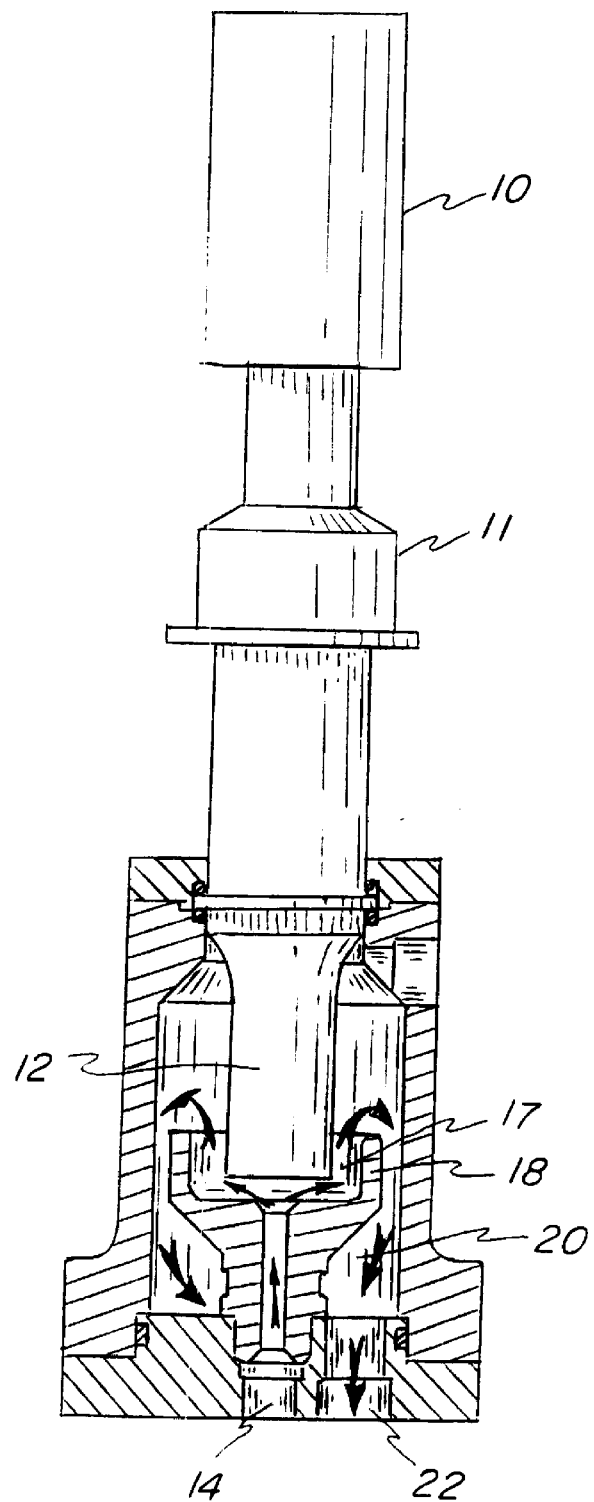
FIG. 1 is a view, partially in section, of an ultrasonic conditioning cell used in experiments leading to this invention.

The Branson cell is illustrated in FIG. 1 as having a converter 10 mounted on a booster 11 and a horn 12 feeding into a stainless steel processor. The stock to be treated enters through a bottom inlet 14 and flows into an annular treatment region 17 where it is subjected to amplified ultrasonic frequency preferably at about 20 kilohertz fed to a piezoelectric or magnetorestrictive converter 10. The vibrations are coupled to the horn 12 to cause intense cavitation in the space 17. The space 17 is formed by an overflow wall 18 so that the processed material follows the arrows 20 to an outlet 22.

Figure 2:
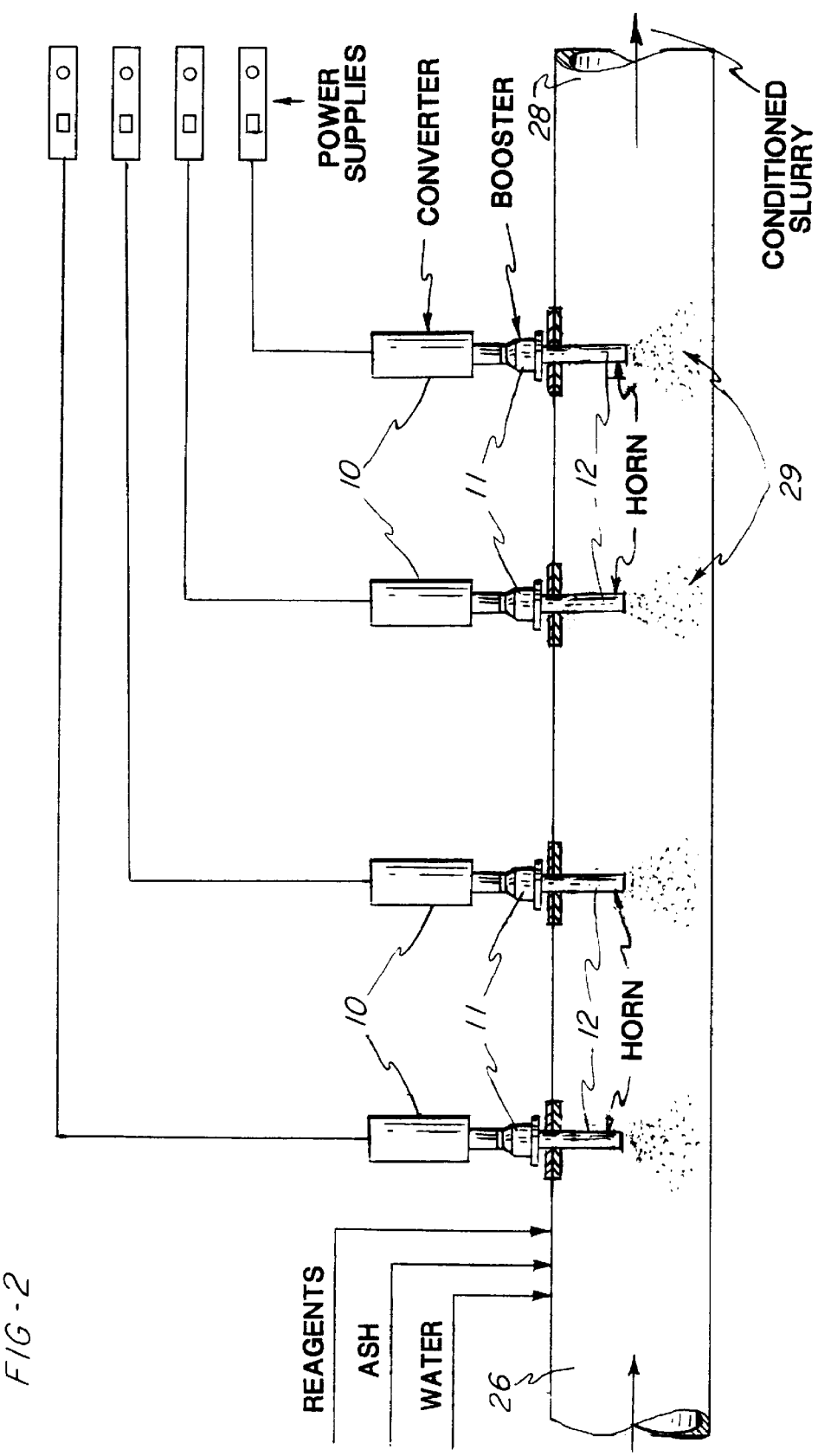
FIG. 2 is a diagram showing a plurality of the ultrasonic horns installed in a conduit for the purpose of processing flow of an ash slurry such as for conditioning an ash to enhance its pozzolanic activity and/or to apply a flotation reagent for the subsequent removal of a carbon fraction in a flotation cell.

In the diagram of FIG. 2, the plurality of the ultrasonic horn assemblies 10, 11, 12 are shown as being installed in a common conduit 25 to provide a conditioning cell in which the water, ash, and reagents as required are applied at one end, such as an inlet end 26 of the conduit 25 and a conditioned slurry is taken out of an outlet end 28. The outlet end 28 may lead to a holding tank for recirculation to the inlet 26, in a batch-type operation, or may be connected for continuous delivery. Cavitation bubbles generated by the horns 12 are represented at 29. The number of horns, their configuration, and amount of energy required in an apparatus as illustrated in FIG. 2 will depend upon the extent of processing required and that can be depend on the condition of the ash, the carbon content, and the process rate. The energy application to the fly ash in terms of kilowatt hours of energy per metric tons of dry solids should be in the order of about 10 to 50 kilowatt hours per ton of dry solids.

In the series of tests, the fly ash samples tested were pre-dried and thoroughly homogenized. Carbon content was obtained using a Leco carbon analyzer. The percent of pozzolan recovery was calculated using carbon contents of the raw or untreated fly ash, and the overflow and underflow fractions from flotation tests. The particle size data, i.e., median size, standard deviation, and specific surface area, were determined using a Horiba particle size analyzer, and fineness was calculated as the percent of particles of a size above 44 $\mu$m and is equivalent to the material retained on a 325 mesh screen. Viscosity measurements were taken for a 65% consistency slurry using a Brookfield viscometer at 10 rpm. All compression strengths were made and determined in accordance with ASTM C618 and ASTM C311 and ASTM C109. Flotation processing was performed in accordance with the disclosure and the apparatus as described in the Pike et al. application.

The table represents tests that were performed in accordance with this invention. In line #1, a control was established using 100% Portland cement, and the 3, 7, and 28-day compression strengths were determined from cubes made in accordance with the previously defined ASTM regulations. On line 2, the same tests were run using an extremely high quality fly ash to provide a benchmark for other fly ash/Portland cement mixes. In this case, a Martin Lake Ash was used which had a carbon content of only 0.1% and a median diameter size of 10.1 $\mu$m. In this case, and in all other cases of a mix, the ratio of Portland cement to fly ash was 80 to 20. It will be noted that the benchmark compressive strengths, line 2, at 7 days and later substantially exceeded the control strength using 100% Portland cement.

In lines 3 and 4 a comparison is made of the effect of ultrasonic conditioning of a fly ash that already had an acceptably low carbon content of 2% to determine the extent to which the fineness of the fly ash is enhanced by ultrasonic conditioning as described above. A 5 kg sample of ash was mixed with 20 liters of water to make a 20% solid slurry. The slurry was circulated through the cell of FIG. 1 at the rate of 1.66 kgs of solids per minute, equal to a rate of 0.1 ton per hour. The processing rate and duration equaled one turnover for the 5 kg sample, equivalent to 10 kw-hours energy input per metric ton of dry solids.

TABLE

| | | Carbon Content % | Pozzolan Recovery % of feed | Horiba Particle Size Analysis Median μm | Std Dev μm | Specific S Area cm2/cm3 | % Inc. | Fineness >44 μm % | % Change | *Viscosity Brookfield cp | % Change | Compressive Strength (psi & % of Control) 3-days psi | % | 7-days psi | % | 28-days psi | % |
|---|---|---|---|---|---|---|---|---|---|---|---|---|---|---|---|---|---|
| 1 | Control (100% Portland Cement) | | | | | | | | | | | 3,565 | 100% | 4,239 | 100% | 5,814 | 100% |
| 2 | Benchmark-Martin Lake Ash GP Bowen Ash (Ultrasonic Conditioning) | 0.1 | | 10.1 | 25.5 | 9,208 | | 24.2 | | | | 3,128 | 88% | 4,261 | 101% | 6,475 | 111% |
| 3 | Ash before Ultrasonic Conditioning | 2.0 | | 26.9 | 42.9 | 4,142 | 12% | 34.8 | −28% | 960 | −53% | 2,428 | 68% | 3,191 | 75% | 4,596 | 79% |
| 4 | Ash after Ultrasonic Conditioning JEA Pozzolans from Svedala (Ultrasonic Conditioning) | 2.0 | | 22.5 | 24.0 | 4,655 | | 25.0 | | 448 | | 3,292 | 92% | 4,159 | 98% | 5,667 | 97% |
| 5 | Pozz-1 before Ultrasonic Conditioning | 0.1 | 39.1 | 25.9 | 2,807 | | 40% | 43.3 | | 256 | −38% | 81% 3,554 | 84% | 4,450 | 77% | | |
| 6 | Pozz-1 after Ultrasonic Conditioning | 0.1 | 27.3 | 23.4 | 3,919 | | | 27.9 | −36% | 160 | | 80% 3,733 | 88% | 4,733 | 81% | | |
| 7 | Pozz-2 before Ultrasonic Conditioning | 1.8 | 9.9 | 20.5 | 7,353 | | | 13.8 | | 704 | −41% | 95% 4,500 | 106% | 6,236 | 107% | | |
| 8 | Pozz-2 after Ultrasonic Conditioning VA Power (Chesterfield) Ash (Mechanical & Ultrasonic Conditioning followed by Carbon Flotation) | 1.8 | 10.4 | 8.9 | 7,666 | | 4% | 0.4 | −97% | 416 | | 3,613 101% | 4,481 | 106% | 6,213 | 107% | |
| 9 | Raw Ash before Ultrasonic Conditioning | 10.5 | | 66.3 | 151.2 | 2,050 | 38% | 63.9 | −31% | 800 | 44% | ND | ND | 3,122 | 74% | 4,621 | 79% |
| 10 | Pozzolan after Mechanical Conditioning | 1.0 | 74.7% | 41.1 | 46.0 | 3,056 | | 47.0 | | | | ND | ND | 3,113 | 73% | 4,792 | 82% |
| 11 | Pozzolan after Ultrasonic Conditioning | 0.6 | 85.5% | 26.0 | 33.0 | 4,217 | | 32.3 | | 1,150 | | ND | ND | 3,404 | 80% | 5,063 | 87% |
| 12 | Float after Mechanical Conditioning | 38.5 | | 47.5 | 97.3 | 4,646 | | 51.4 | | | | | | | | | |
| 13 | Float after Ultrasonic Conditioning JEA -48 Mesh Colombian Coal Ash (Mechanical & Ultrasonic Conditioning followed by Carbon Flotation) | 68.9 | | 50.7 | 68.7 | 3,241 | | 54.5 | | | | | | | | | |
| 14 | Raw Ash before Ultrasonic Conditioning | 12.0 | | 41.9 | 66.0 | 3,465 | 65% | 48.1 | −59% | 352 | 18% | 2,579 | 72% | 3,229 | 76% | 4,325 | 74% |
| 15 | Pozzolan after Mechanical Conditioning | 5.8 | 60.3% | 44.7 | 53.1 | 2,816 | | 49.1 | | | | 3,138 | 88% | 3,625 | 86% | 4,546 | 78% |
| 16 | Pozzolan after Ultrasonic Conditioning | 6.4 | 81.2% | 22.5 | 19.8 | 4,642 | | 20.3 | | 416 | | 3,696 | 104% | 3,979 | 94% | 5,571 | 96% |
| 17 | Float after Mechanical Conditioning | 21.4 | | 28.7 | 32.0 | 5,141 | | 37.9 | | | | | | | | | |
| 18 | Float after Ultrasonic Conditioning | 36.2 | | 18.0 | 18.2 | 5,812 | | 14.1 | | | | | | | | | |

*Modified Brookfield viscosity: 65% solids slurry @ 10 RPM
**Carbon flotation reagents type and dosage were not optimized. Hence, higher than desired carbon contents.

Line 3 of the table shows the fineness distribution and +44 µm component before processing while line 4 shows the results after processing. Significantly, the specific area was increased by 12% and the 325 Mesh retention (+44 µm) was decreased by 28%. It is also seen that while the test cubes made using the unprocessed fly ash of line 3 provided a result which equaled, in 28 days, 79% of the control, after ultrasonic conditioning, the 28-day strength equaled 97% of the control. Also, comparing lines 3 and 4, it will be seen that the viscosity was reduced by 53%. This is the result of the breaking up of agglomerations of pozzolan or fly ash particles which breaking up reduces the slurry resistance to flow, and hence the lower viscosity. Reference may be made to the SEM image, FIG. 3 which shows a typical fly ash agglomerate particle 61 before being broken up.

Lines 5 to 8 of the table represent tests which were performed with pozzolans which had begun as a relatively high carbon ash, around 10% but which had been subjected to flotation in accordance with the process and equipment of the previously defined co-pending Pike et al. application. The term "Pozz-1" represents the non-carbon fraction removed from the first flotation cells 15 on feed line 16 of that application, where it will be seen that the carbon content had been reduced to 0.1% but the specific area was only 2807 $CM^2/CM^3$. The same material was subjected to ultrasonic conditioning according to this invention using the same quantities and conditions as set forth in the description of lines 3 and 4 above and resulted in a 40% increase in specific area, and the 28-day strength increase of 4%, on line 6. Also, the viscosity was reduced by 38% showing the break up of the agglomerates of pozzolan particles into smaller particles.

In lines 7 and 8, "Pozz-2" represents the bottom feed from the second bank of flotation cells 22, represented on feed line 24 of the Pike et al. application. This was the flotation of the float from the first flotation and began with a carbon content of approximately 25% or more, and was subjected to pre-flotation wet attrition milling in the mechanical attrition scrubber 20 of the Pike et al. application prior to flotation. It will be seen that the specific area was 7,353 with 13.8% retained on a 325 mesh screen.

Line 8 represents the same Pozz-2 material which has been further subjected to ultrasonic conditioning according the procedures set forth for lines 2 and 3 above. In spite of the fact that the material had already been subjected to mechanical wet scrubbing in an attrition mill containing a load of steel milling balls, nevertheless ultrasonic conditioning substantially reduced the fineness from 13.8% to 0.4% retained on the 325 mesh screen and increased the specific area to 7,666. Significantly, the viscosity was reduced by 41% at the same time confirming the overall particle size reduction.

In tests reported on lines 9 through 13, a high carbon content raw fly ash having a carbon content of 10.5 and a relatively coarse and wide ranging size distribution was tested. The coarseness of this material may be seen in the 63.9% retention on a 325 mesh screen (>44 µm).

This material was subjected to mechanical conditioning and first flotation as was the case for Pozz-1 of line 5, providing a reduction of carbon content to an acceptable 1% and providing a reasonable improvement in the standard size deviation. This material, as in the case of line 6, was then subjected to ultrasonic conditioning followed by carbon flotation and the results are reported on line 11. In this case, a 2.5 kg sample was mixed with 10 liters of water to make a 20% slurry. Cytec-type 8257 collector (as defined in the Pike et al. application) was added to the slurry at the rate of 0.68 grams/kg, providing an effective rate of 1.5 pounds per ton, and the slurry was circulated at the rate of 0.5 kg of solid per minute for a total of 5 minutes ultrasonic radiation such that the process rate and duration translated into one turnover for the 2.5 kg sample. The power equivalent applied to these runs (lines 9–13) was 34 kilowatt hours per ton of dry solids. Cytec frother 9704 was added to the slurries of lines 10 and 11 prior to flotation in a Denver D-12 flotation cell. After flotation, and carbon removal, the carbon and pozzolan slurries were dewatered, dried, homogenized, and then split for sampling.

Line 11 shows that ultrasonic conditioning that was used in lieu of mechanical conditioning provided, prior to flotation, a pozzolan with only 0.6% carbon but provided a specific area of 4,217 $CM^2/CM^3$, an increase of 38%. Significantly, the increase in viscosity of line 11 over line 10 is the result of the increase of fine pozzolan particles liberated by the ultrasonic conditioning. This increase in fine particle count in a mix of larger particles results in the increase of slurry resistance to flow, hence a higher viscosity. Reference may be had to the SEM photo of FIG. 4 which shows a typical carbon matrix with entrapped fine pozzolan particles, (microspheres), prior to ultrasonic conditioning which fine particles are released by ultrasonic conditioning.

Significantly, the float merely using mechanical conditioning provided 38.5% carbon whereas the float in which ultrasonic conditioning was used provided 68.9% carbon as reported in lines 12 and 13. This indicates that ultrasonic conditioning can provide a float with a substantially increased purity of carbon content.

The test results reported in lines 14 through 18 essentially duplicate the test results reported in lines 9 through 13 with the exception that a Columbian coal ash was used which began with a high carbon content of 12%. The testing conditions of the results reported in lines 15 through 18 duplicate those which have been defined above with respect to lines 10 through 13. The test results strongly confirm the efficacy of ultrasonic conditioning, particularly, the 65% increase in specific surface area from 2816 to 4642 of a pozzolan which had been pre-flotation treated by ultrasonic conditioning, as described. Further, a significant improvement is seen in the 28-day strength test of the cubes using the ash of line 16 as compared to the ash of lines 14 and 15, which can be attributed to the substantial increase in surface area, and substantial decrease in size deviation of the particles. The increase in specific surface area in lines 11 and 16 may be attributed in large part to the release of microspheres from the carbon fraction by the ultrasonic conditioning.

Referring to lines 17 and 18, although the float after ultrasonic conditioning produced a carbon content of 36.2%, substantially less than that which was produced using the ash from the Virginia Power Company plant at Chesterfield, nevertheless this recovery was substantially greater than that accomplished by mechanical conditioning.

Figure 5:
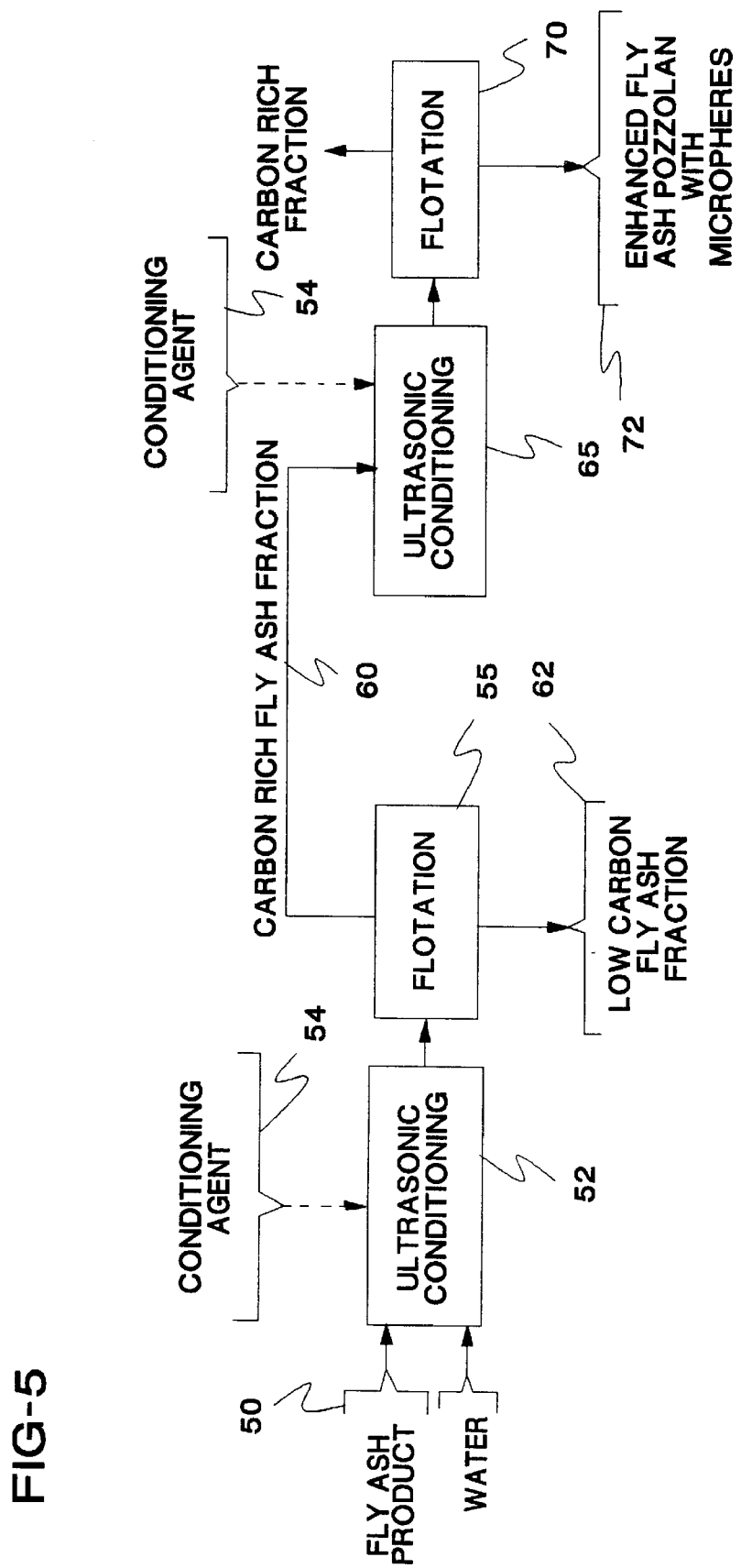
FIG. 5 is a diagrammatic illustration of certain steps practiced by the invention.

Referring to FIG. 5, a fly ash product 10 which has been formed as a water slurry, which may have about 20% solids or greater is conditioned in an ultrasonic conditioner 52 constructed as illustrated in FIG. 2, and a conditioning agent 54 may be added at this point, as previously described.

The flotation process 55 may use a conventional floatation cell to provide a first carbon rich fraction 60 and a fly ash fraction 62. The fly ash fraction will preferably have a low carbon content of about 1% or less.

Figure 3:
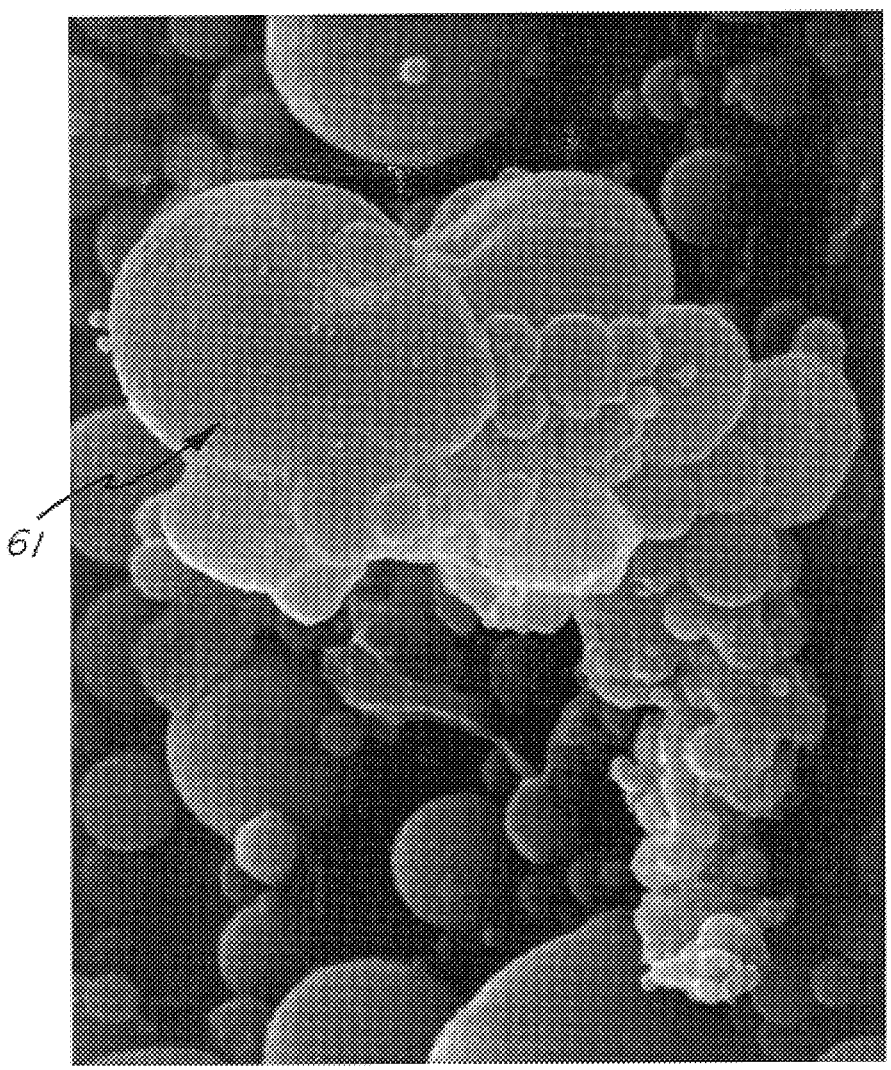
FIG. 3 is a representation of an actual scanning electron microscope scan showing typically weakly bonded or agglomerated fly ash particles which can be caused to break along cleavage planes and separate from each other with ultrasonic energy.
Figure 4:
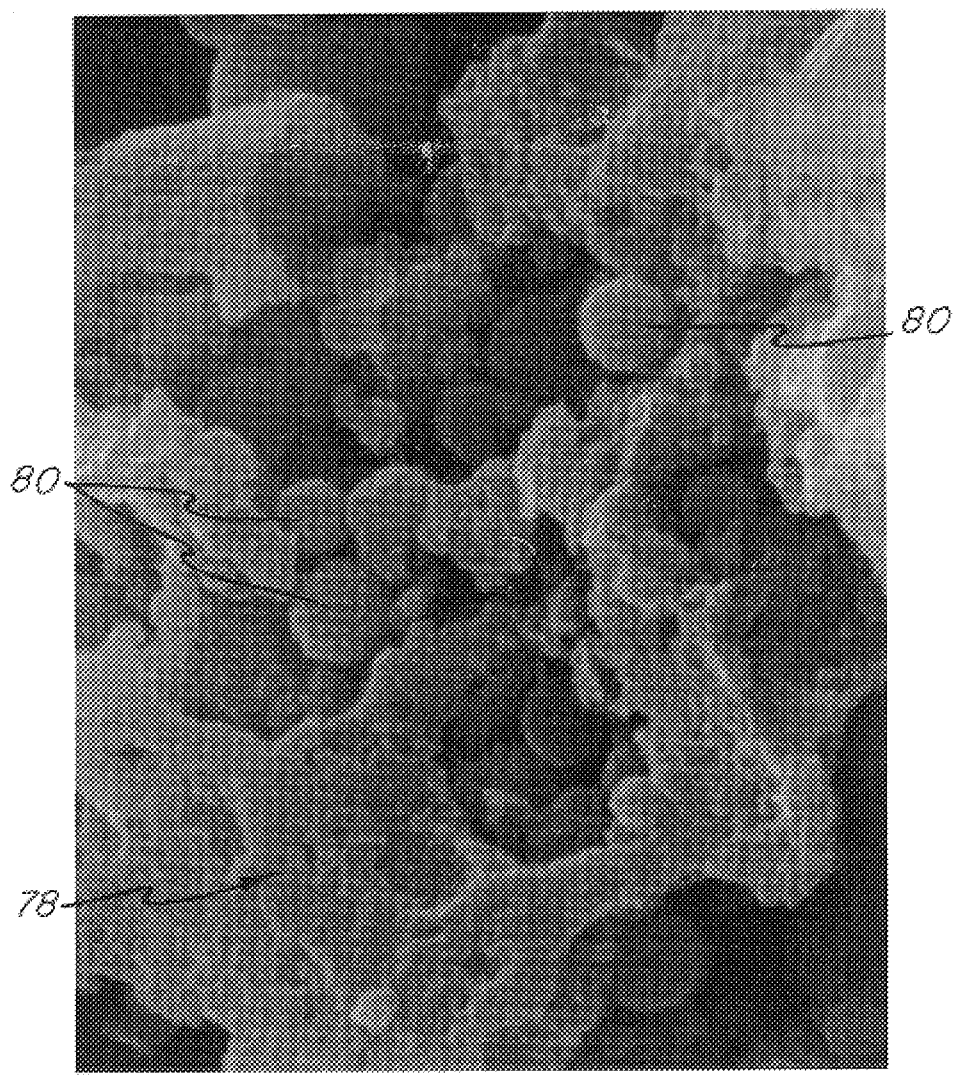
FIG. 4 is a further representation of an actual electronic microscope scan showing a matrix of carbon particles with microspheres entrapped within the particles.

The carbon rich fraction, for the purpose of the invention, is also considered to comprise a fly ash product since it contains a substantial amount of fly ash particles and which contains agglomeration of fly ash particles such as shown by the agglomeration particle 61 in FIG. 3. The fraction 60 also contains matrices of carbon 78 having entrapped fly ash microspheres, as illustrated by the entrapped microspheres 80, as shown in FIG. 4. A particular object of this invention to apply ultrasonic conditioning, as illustrated at 62 in FIG. 5, to the first flotation carbon rich fraction, with or without the addition of a conditioning agent 55 and subject this flotation fraction to a second flotation step 70. A conditioning agent may be added prior to or during ultrasonic treatment, as described. It will be understood that the ultrasonic conditioning steps 52 and 62 will be performed preferably under the conditions previously described in connection with FIGS. 1 and 2 as to frequency, power input, and consistency or percents of solids in the fly ash slurries.

The output of the second flotation 70 will be a carbon rich fraction as the overflow and an enhanced pozzolan with microspheres 72 as the underflow. This product may be dried and used alone or may be combined with the fly ash fraction 62 to provide an enhanced fly ash pozzolan.

It will therefore be seen that ultrasonic conditioning with power rates as low as 10 kilowatt hours per ton of dry solids is capable of providing a substantial size reduction in fly ash and simultaneously provide excellent conditioning results with a flotation reagent, to the end that the fly ash component is enhanced substantially over the same component with merely mechanical conditioning, in regard to its pozzolanic activity and its strength characteristics.

While the processes and products herein described constitute preferred embodiments of the invention, it is to be understood that the invention is not limited to these precise processes and products, and that changes may be made therein without departing from the scope of the invention which is defined in the appended claims.

What is claimed is:

1. The process of conditioning a fly ash product, which product contains agglomerations of fly ash particles, and contains matrices of carbon having entrapped fly ash microspheres therein, to form an enhanced pozzolan fraction of fly ash particles with microspheres and with reduced carbon content, and to form a carbon rich fraction, comprising the steps of:

forming a slurry of such fly ash product and water;

treating said slurry by adding conditioning agents and applying ultrasonic energy to said slurry containing said conditioning agents to break up the agglomerations and fracture the carbon matrices and thereby release from said matrices into said slurry entrapped microspheres and reduce the mean size of the fly ash particles; and separating by flotation a carbon fraction from said ultrasonically treated slurry to form said carbon rich fraction and said enhanced pozzolan fraction.

2. The process of claim 1 in which said ultrasonic energy has a frequency of about 20 kilohertz.

3. The process of claim 1 in which said ultrasonic energy is applied at an equivalent rate of about 10–50 kilowatt hours per metric ton of dry fly ash.

4. The process of claim 1 in which said slurry is at least about 20% solids.

5. The process of treating fly ash as a byproduct of burning an ash containing fuel in which the fly ash contains a carbon component containing fly ash microspheres, comprising the steps of subjecting the fly ash to flotation in flotation cells, removing therefrom an overflow which has a carbon rich fraction and a first underflow, and subjecting said overflow to ultrasonic conditioning for releasing microspheres from the carbon rich fraction and fracturing and reducing in size the fly ash component, and subjecting the ultrasonic treated product to further flotation to provide a second underflow essentially free of carbon particles and having a substantially increased surface area.

6. The process according to claim 5 in which a collector reagent is added to said overflow prior to or during said ultrasonic conditioning step.

7. The process according to claim 5 comprising the further step of combining said first and second underflows to form a fly ash pozzolan enhanced with microspheres.

\* \* \* \* \*

UNITED STATES PATENT AND TRADEMARK OFFICE
CERTIFICATE OF CORRECTION

PATENT NO. : 5,840,179
DATED : November 24, 1998
INVENTOR(S) : Rafic Y. Minkara and Jerry L. Heavilon It is certified that error appears in the above-indentified patent and that said Letters Patent is hereby corrected as shown below:

On the title page, and col. 1,
Please note that the correct spelling of the title in this application should be ULTRASONIC CONDITIONING AND WET <u>SCRUBBING</u> OF FLY ASH.

Signed and Sealed this

Sixteenth Day of March, 1999

Attest:

Q. TODD DICKINSON

Attesting Officer

Acting Commissioner of Patents and Trademarks